US012749093B2

(12) United States Patent
Yoshino et al.

(10) Patent No.: US 12,749,093 B2
(45) Date of Patent: Sep. 29, 2026

(54) INFORMATION PROCESSING APPARATUS, INFORMATION PROCESSING METHOD, AND NON-TRANSITORY COMPUTER READABLE STORAGE MEDIUM

(71) Applicant: LY Corporation, Tokyo (JP)

(72) Inventors: Tomohiro Yoshino, Tokyo (JP); Youhei Kubota, Tokyo (JP); Genki Teranaka, Tokyo (JP)

(73) Assignee: LY Corporation, Tokyo (JP)

( * ) Notice: Subject to any disclaimer, the term of this patent is extended or adjusted under 35 U.S.C. 154(b) by 0 days.

(21) Appl. No.: 19/187,924

(22) Filed: Apr. 23, 2025

(65) Prior Publication Data

US 2026/0057411 A1 Feb. 26, 2026

(30) Foreign Application Priority Data

Aug. 20, 2024 (JP) ................................ 2024-139314

(51) Int. Cl.
*G06Q 30/02* (2023.01)
*G06Q 30/0241* (2023.01)
*G06Q 30/0251* (2023.01)

(52) U.S. Cl.
CPC ..... *G06Q 30/0256* (2013.01); *G06Q 30/0276* (2013.01)

(58) Field of Classification Search
CPC ........ G06Q 30/0256; G06Q 30/0207–30/0277
See application file for complete search history.

(56) References Cited

U.S. PATENT DOCUMENTS

2013/0125156 A1* 5/2013 Shah .................. H04N 21/8153 725/14
2014/0115622 A1* 4/2014 Chang .................. H04N 21/854 725/25
2014/0278998 A1* 9/2014 Systrom ............ G06Q 30/0277 705/14.57
2014/0358679 A1* 12/2014 Levinson ........... G06Q 30/0251 705/14.49
2016/0132931 A1* 5/2016 Levinson ........... G06Q 30/0246 705/14.45
2016/0342624 A1* 11/2016 Mazur ................. G06F 16/5866
2021/0056588 A1* 2/2021 Kim ...................... G06F 16/538
2022/0156800 A1* 5/2022 Stoev ................. G06Q 30/0276
2023/0281673 A1* 9/2023 Gupta ................ G06Q 30/0276 705/14.72
2024/0193913 A1* 6/2024 Saraee .................. G06F 16/438
2024/0311546 A1* 9/2024 Maschmeyer ........ G06F 40/106
2024/0311876 A1* 9/2024 Bastide .............. G06Q 30/0277
2024/0354810 A1* 10/2024 Rovatsos ........... G06Q 30/0275

FOREIGN PATENT DOCUMENTS

CN 111833099 B * 8/2021
CN 117609464 A * 2/2024
JP 2024-013501 A 2/2024
WO WO 2024/172194 A1 * 2/2023

* cited by examiner

*Primary Examiner* — Thuy N Nguyen
(74) *Attorney, Agent, or Firm* — Procopio, Cory, Hargreaves & Savitch LLP

(57) ABSTRACT

An information processing apparatus according to the present invention includes a generation unit and a search unit. The generation unit generates tag information on a tag type that is set in advance with respect to an advertisement material. The search unit that searches for the advertisement material that is used for a new advertisement by using the tag information that is generated by the generation unit.

11 Claims, 6 Drawing Sheets

| ADVERTISEMENT MATERIAL ID | IMAGE | TAG TEXT | TAG VECTOR |
|---|---|---|---|
| ADVERTISEMENT MATERIAL 01 | IMAGE 01 | TAG TEXT 01 | TAG VECTOR 01 |
| ADVERTISEMENT MATERIAL 02 | IMAGE 02 | TAG TEXT 02 | TAG VECTOR 02 |
| ADVERTISEMENT MATERIAL 03 | IMAGE 03 | TAG TEXT 03 | TAG VECTOR 03 |
| ... | ... | ... | ... |

| TEMPLATE ID | IMAGE INSERTION POSITION | TEXT INSERTION POSITION | ... |
|---|---|---|---|
| TEMPLATE 01 | INSERTION POSITION 01 | INSERTION POSITION 01 | ... |
| TEMPLATE 02 | INSERTION POSITION 02 | INSERTION POSITION 02 | ... |
| TEMPLATE 03 | INSERTION POSITION 03 | INSERTION POSITION 03 | ... |
| ... | ... | ... | ... |

INFORMATION PROCESSING APPARATUS, INFORMATION PROCESSING METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2024-139314 filed in Japan on Aug. 20, 2024.

BACKGROUND OF THE INVENTION

1. Field of the Invention

The present invention relates to an information processing apparatus, an information processing method, and an information processing program.

2. Description of the Related Art

Conventionally, a technology for supporting generation of an advertisement image has been proposed. For example, Japanese Laid-open Patent Publication No. 2024-13501 discloses a technology for generating a model that is trained with respect to a relationship between each of advertisement images and a Click Through Rate (CTR).

Further, Japanese Laid-open Patent Publication No. 2024-13501 discloses a technology for generating a plurality of candidate advertisement images based on an original advertisement image that is generated by an advertiser, and proposing a candidate advertisement image that is expected to improve the CTR as compared to the original advertisement image among the plurality of candidate advertisement images.

However, in the conventional technology, a new advertisement image is generated based on an original advertisement image, and therefore, it is needed to generate the original advertisement image in advance. Further, to generate the original advertisement image, there is a need for a technology that makes it easy to search for an advertisement material.

SUMMARY OF THE INVENTION

An information processing apparatus according to the present invention includes a generation unit and a search unit. The generation unit generates tag information on a tag type that is set in advance with respect to an advertisement material. The search unit that searches for the advertisement material that is used for a new advertisement by using the tag information that is generated by the generation unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Modes (hereinafter, described as “embodiments”) for carrying out an information processing apparatus, an information processing method, and an information processing program according to the present application will be described in detail below with reference to the drawings. The information processing apparatus, the information processing method, and the information processing program according to the present application are not limited by the embodiments below.

Embodiment

1. Information Processing

Figure 1:
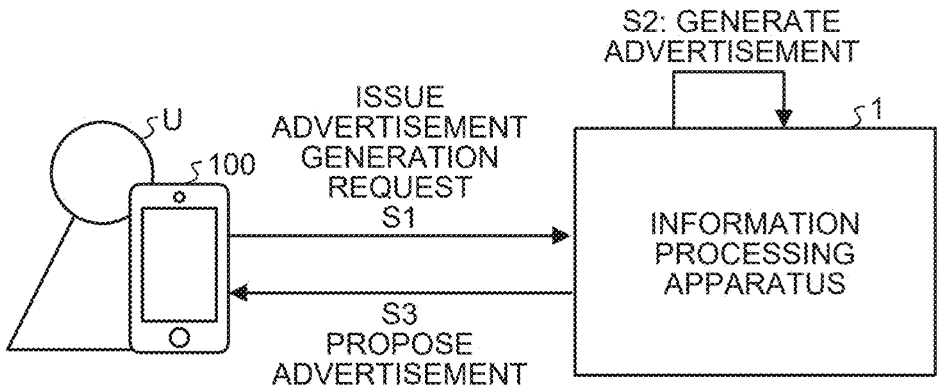
FIG. 1 is a diagram for explaining an overview of information processing according to one embodiment.

An example of information processing according to one embodiment will be described below with reference to FIG. 1. FIG. 1 is a diagram for explaining an overview of the information processing according to one embodiment. The information processing according to one embodiment is implemented by an information processing apparatus 1 illustrated in FIG. 1.

The information processing apparatus 1 illustrated in FIG. 1 is an information processing apparatus that generates an advertisement by processes as will be described later. The information processing apparatus 1 is implemented by, for example, a cloud system or a server.

A creator terminal 100 illustrated in FIG. 1 is a terminal device that is owned by a creator U who generates an advertisement. For example, the creator U is able to request the information processing apparatus 1 to generate an advertisement by operating the creator terminal 100. Meanwhile, FIG. 1 illustrates an example in which the creator terminal 100 is a smartphone, but the creator terminal 100 may be a different apparatus, such as a Personal computer (PC).

As illustrated in FIG. 1, the creator terminal 100 issues an advertisement generation request to the information processing apparatus 1 (Step S1). The information processing apparatus 1 generates an advertisement based on the advertisement generation request that is received from the creator terminal 100 (Step S2).

Further, the information processing apparatus 1 proposes (provides) the generated advertisement to the creator terminal 100 (Step S3). For example, the creator terminal 100 is able to request the information processing apparatus 1 to generate an advertisement image of a banner advertisement or the like, and the information processing apparatus 1 generates the advertisement image based on the request that is issued by the creator terminal 100.

In this manner, the information processing apparatus 1 according to one embodiment performs a process related to automatic generation of an advertisement. Meanwhile, in recent years, image generation Artificial Intelligence (AI) for generating an image corresponding to a sentence in a natural language is becoming popular, and in some cases, the image generation AI may be used to automatically generate an advertisement.

However, when an advertisement is generated by using the image generation AI, damage of an advertisement material that is used as the advertisement and copyright infringement are matters of concern. Therefore, in one embodiment, an advertisement is generated by using an advertisement material or the like that has been used as an advertisement in the past.

Figure 2:
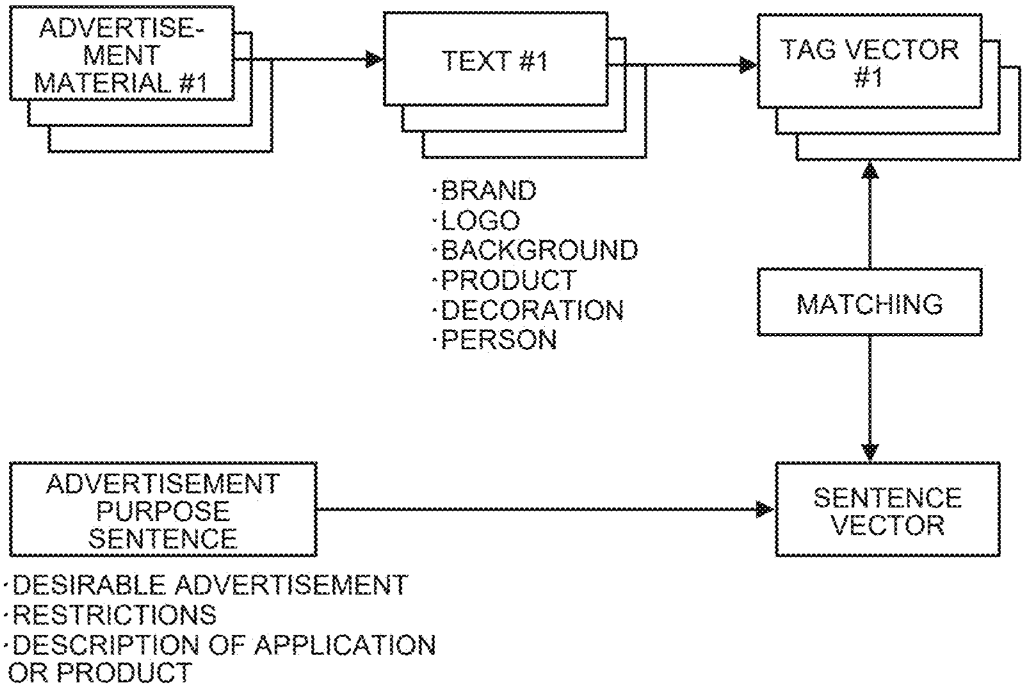
FIG. 2 is a diagram illustrating an example of a generation process according to one embodiment.

A series of processes related to generation of an advertisement image will be described below with reference to FIG. 2. FIG. 2 is a diagram illustrating an example of a generation process according to one embodiment. As illustrated in an upper part in FIG. 2, an image that is an advertisement material is first converted to text.

The information processing apparatus 1 converts the advertisement material to text by using a model (AI) that converts an image to text. As illustrated in FIG. 2, the text includes items of a brand, a logo, a background, a product, a decoration, a person, and the like.

Specifically, the information processing apparatus 1 generates tag information on the advertisement material by using the model that converts an image to text. Subsequently, the text that is converted from the image is further converted to a tag vector.

The tag vector is a vector that is obtained by converting the text (tag information) of the advertisement material to an N-dimensional vector. For example, the information processing apparatus 1 is able to convert the text of the advertisement material to the tag vector by using the Embedding model or the like.

Furthermore, as illustrated in a lower part in FIG. 2, an advertisement purpose sentence that is input by the creator U is converted to a sentence vector. The advertisement purpose sentence is a sentence that indicates a purpose of generation of the advertisement, and includes, for example, items, such as a desirable advertisement, restrictions, and a description of an application or a product.

The information processing apparatus 1 converts the advertisement purpose sentence to the sentence vector by using the Embedding model, similarly to the tag vector. Further, the information processing apparatus 1 searches for an advertisement material that fits for the advertisement purpose sentence by performing matching between the tag vector and the sentence vector. Meanwhile, the advertisement material may be searched for by, for example, a certain method, such as a vector nearest neighbor search. In other words, a tag vector or the like for which a cosine similarity with the sentence vector exceeds a threshold among all of the tag vectors is retrieved.

Furthermore, the information processing apparatus 1 may search for an advertisement material that fits for the advertisement purpose sentence by, for example, performing matching between the text (tag information) of the advertisement material and the advertisement purpose sentence. For example, in this case, the information processing apparatus 1 may be able to realize the search by inputting the text (tag information) of the advertisement material and the advertisement purpose sentence to a natural language processing model, such as a Generative Pre-trained Transformer (GPT), and searching for an advertisement material that fits for the advertisement purpose sentence.

In this manner, the information processing apparatus 1 according to one embodiment generates tag information on a tag type that is set in advance with respect to an advertisement material, and searches for the advertisement material by comparing the generated tag information and the advertisement purpose sentence.

Therefore, according to the information processing apparatus 1 of one embodiment, it is possible to easily search for an advertisement material and improve efficiency of generation of an advertisement.

2. Information Processing Apparatus

Figures 3, 4:
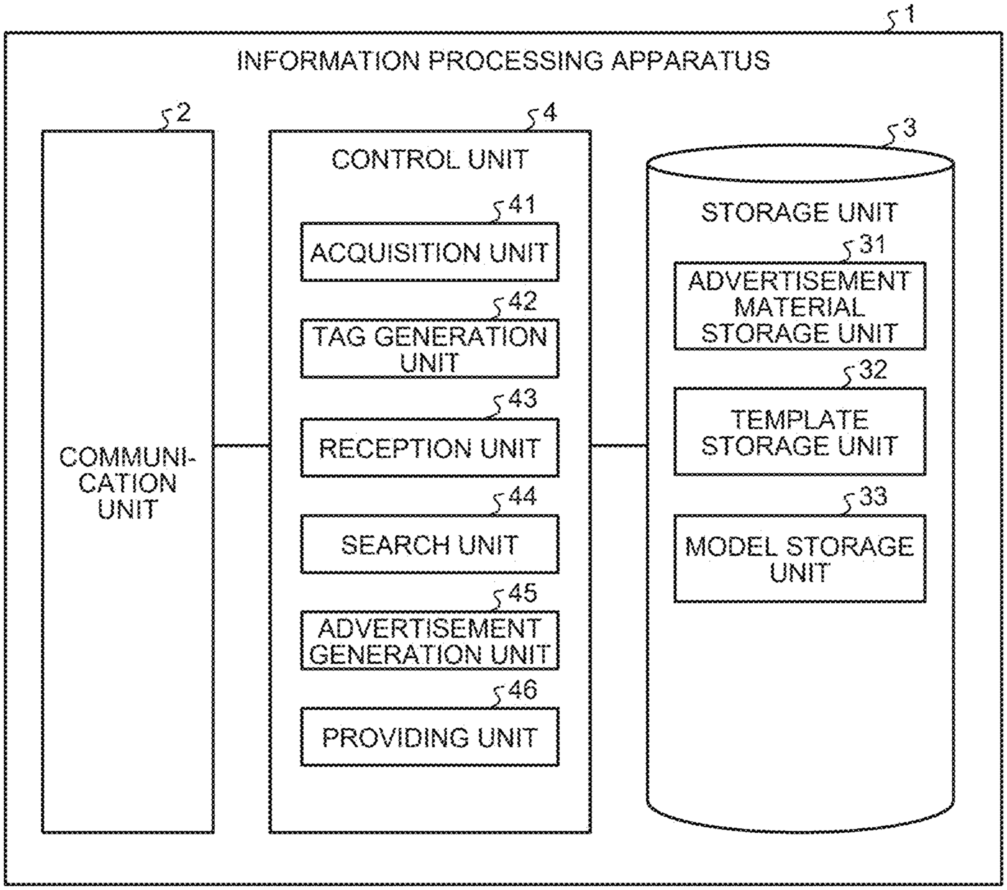
FIG. 3 is a block diagram illustrating a configuration example of an information processing apparatus according to one embodiment.
FIG. 4 is a diagram illustrating an example of information that is stored in an advertisement material storage unit according to one embodiment.

A configuration example of the information processing apparatus 1 according to one embodiment will be described below with reference to FIG. 3. FIG. 3 is a block diagram illustrating a configuration example of the information processing apparatus 1 according to one embodiment. As illustrated in FIG. 3, the information processing apparatus 1 includes a communication unit 2, a storage unit 3, and a control unit 4. Meanwhile, the information processing apparatus 1 may include an input unit (for example, a keyboard, a mouse, or the like) that receives various kinds of operation from an administrator or the like who uses the information processing apparatus 1, or a display unit (for example, a liquid crystal display or the like) for displaying various kinds of information.

The communication unit 2 is implemented by, for example, a Network Interface Card (NIC) or the like. The communication unit 2 is connected to a communication network, such as 4th Generation (4G) or 5th Generation (5G), in a wired or wireless manner, and transmits and receives information to and from each of apparatuses, such as the creator terminal 100, via the communication network.

The storage unit 3 is implemented by, for example, a semiconductor memory device, such as a Random Access Memory (RAM) or a Flash Memory, or a storage device, such as a hard disk or an optical disk. The storage unit 3 includes an advertisement material storage unit 31, a template storage unit 32, and a model storage unit 33.

The advertisement material storage unit 31 stores therein an advertisement material. The advertisement material includes an image that is a material of an advertisement that has been used in the past, and an image that is generated by the creator U. FIG. 4 is a diagram illustrating an example of information that is stored in the advertisement material storage unit 31 according to one embodiment.

As illustrated in FIG. 4, the advertisement material storage unit 31 stores therein pieces of information on items such as an "advertisement material ID", an "image", a "tag text", and a "tag vector" in an associated manner.

In the item of the "advertisement material ID", an identifier for identifying each of advertisement materials is stored. In the item of the "image", image data of an advertisement material that is identified by a corresponding advertisement material ID is stored.

In the item of the "tag text", a tag text (tag information) of the advertisement material that is identified by the corresponding advertisement material ID is stored. In the item of the "tag vector", a tag vector that is obtained by converting the tag information on the advertisement material that is identified by the corresponding advertisement material ID to a vector is stored.

Referring back to explanation of FIG. 3, the template storage unit 32 will be described. The template storage unit 32 stores therein a template. The template is a template that is used at the time of generation of the advertisement. Meanwhile, the template is registered in advance by the creator U or the like based on, for example, a past advertisement.

Figures 5, 6:
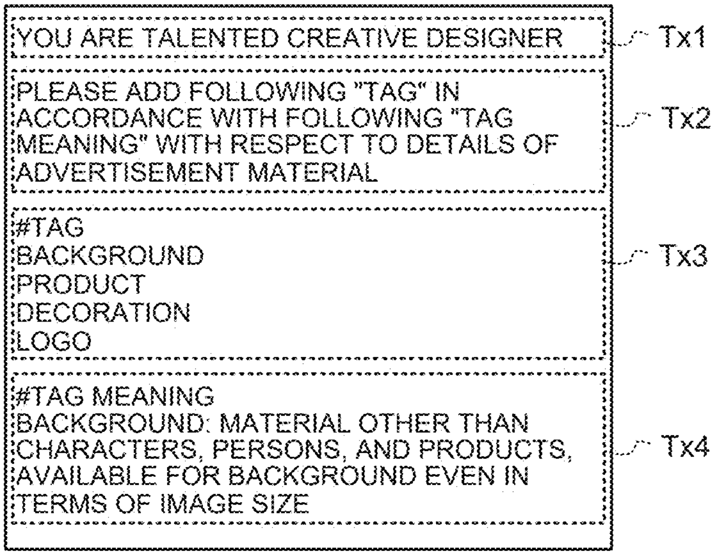
FIG. 5 is a diagram illustrating an example of information that is stored in a template storage unit according to one embodiment.
FIG. 6 is a diagram illustrating an example of an instruction prompt according to one embodiment.

FIG. 5 is a diagram illustrating an example of information that is stored in the template storage unit 32 according to one embodiment. As illustrated in FIG. 5, the template storage unit 32 stores therein pieces of information on items such as a "template ID", an "image insertion position", and a "text insertion position" in an associated manner.

In the item of the "template ID", an identifier for identifying each of templates is stored. In the item of the "image insertion position", information related to a position at which an image (advertisement material) is inserted in a template that is identified by a corresponding template ID is stored. In the item of the "image insertion position", information related to a plurality of image insertion positions may be stored or information related to an insertable image size for each of insertion positions may be stored.

In the item of the "text insertion position", information related to a position at which text is inserted in the template that is identified by the corresponding template ID is stored. Meanwhile, in the item of the "text insertion position", information related to a font size, the number of characters, and the like of insertable text may be stored.

Referring back to explanation of FIG. 3, the model storage unit 33 will be described. The model storage unit 33 stores therein a model. For example, the model includes a natural language processing model, such as a GPT, the Embedding model that converts text to a vector, and the like.

The control unit 4 will be described below. The control unit 4 is a controller, and is implemented by, for example, causing a Central Processing Unit (CPU), a Micro Processing Unit (MPU), or the like to execute various kinds of programs (corresponding to one example of the information processing program) that are stored in a storage device inside the information processing apparatus 1 by using a RAM as a work area. Further, the control unit 4 is a controller, and is implemented by, for example, an integrated circuit, such as an Application Specific Integrated Circuit (ASIC) or a Field Programmable Gate Arrays (FPGA).

As illustrated in FIG. 3, the control unit 4 includes an acquisition unit 41, a tag generation unit 42, a reception unit 43, a search unit 44, an advertisement generation unit 45, and a providing unit 46, and implements or executes functions and operation of information processing as described below. Meanwhile, an internal configuration of the control unit 4 is not limited to the configuration as illustrated in FIG. 3, and it is possible to adopt a different configuration as long as the information processing to be described below is performed. Furthermore, a connection relationship of the processing units that are included in the control unit 4 is not limited to the connection relationship as illustrated in FIG. 3, and it is possible to adopt a different connection relationship.

The acquisition unit 41 acquires an advertisement material. The acquisition unit 41 acquires an advertisement material that has been used for a past advertisement or an advertisement material that is newly generated by the creator U or the like. For example, the acquisition unit 41 acquires an advertisement material that is used for an advertisement that is registered in an advertisement database (not illustrated), from the advertisement database. Furthermore, the acquisition unit 41 registers the acquired advertisement material in the advertisement material storage unit 31.

The tag generation unit 42 generates tag information on a tag type that is set in advance, with respect to the advertisement material. For example, the tag generation unit 42 generates the tag information by using a model that converts an image of an advertisement material to text.

Furthermore, the tag generation unit 42 performs role setting with respect to the model, and thereafter generates the tag information. Specifically, the tag generation unit 42 inputs, to the model, the advertisement material and a prompt that includes an instruction sentence for generating the tag information.

A specific example of an instruction prompt will be described below with reference to FIG. 6. FIG. 6 is a diagram illustrating an example of the instruction prompt according to one embodiment. As illustrated in FIG. 6, the instruction prompt includes a first text Tx1 to a fourth text Tx4.

The first text Tx1 is a sentence for performing role setting. In the present disclosure, to perform a process related to an advertisement, the first text Tx1 includes a sentence for setting a "talented creative designer" as the role setting.

The second text Tx2 is a sentence for giving a specific instruction to generate the tag information. The third text Tx3 is a sentence for instructing a tag type, and the fourth text Tx4 is a sentence for defining a meaning of each of tags that are specified by the tag type.

The tag generation unit 42 inputs a prompt that includes the instruction prompt as described above to the model, so that the model outputs, as the tag information, a sentence in a natural language corresponding to the instruction prompt. Thereafter, the tag generation unit 42 converts the tag information that is output from the model to a vector, and registers the vector in the item of the tag vector in the advertisement material storage unit 31.

The reception unit 43 receives a request for generation of a new advertisement from a creator or the like. At this time, the reception unit 43 receives input of an advertisement purpose sentence from the creator via the creator terminal 100. The advertisement purpose sentence includes sentences of items related to a desirable advertisement, restrictions, a description of an application or a product, and the like.

The search unit 44 searches for an advertisement material that is used for the new advertisement, by using the tag information that is generated by the tag generation unit 42. Specifically, the search unit 44 converts the advertisement purpose sentence to a vector, compares the vector of the advertisement purpose sentence and a vector of each of advertisement materials that are stored in the advertisement material storage unit 31, and searches for an advertisement material that is used for the new advertisement.

When searching for a single advertisement material with respect to the advertisement purpose sentence, the search unit 44 searches for a vector of an advertisement material that is the closest to the vector of the advertisement purpose sentence from among the vectors of the advertisement materials. Further, for example, the search unit 44 may search for a plurality of advertisement materials with respect to the advertisement purpose sentence.

For example, in this case, the search unit 44 may generate combined materials in each of which a plurality of advertisement materials are combined, calculate a degree of match with the advertisement purpose sentence for each of the combined materials, and output, as a detection result, a combined material for which the degree of match is high.

Figure 7:
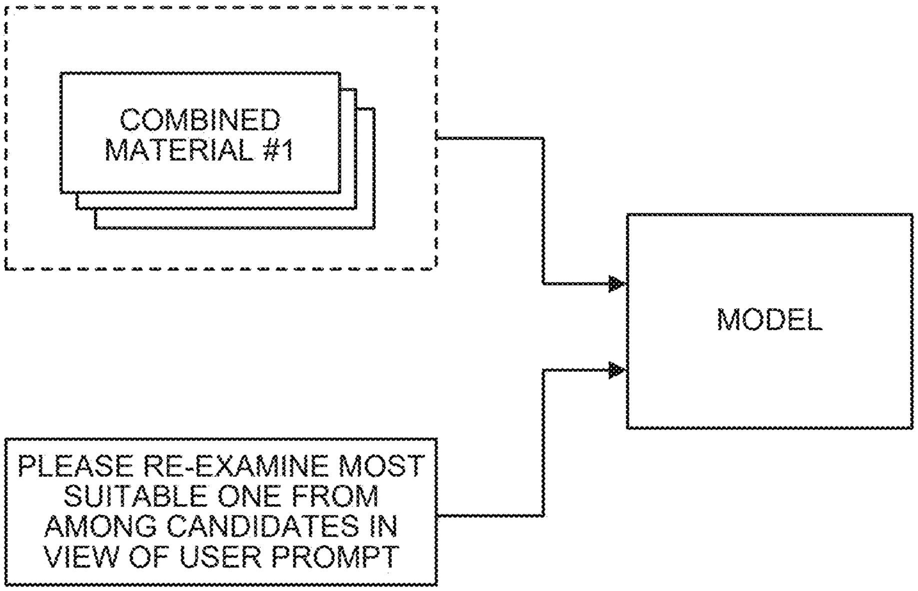
FIG. 7 is a schematic diagram of a search process that is performed by a search unit.

In this case, the search unit 44 may perform the above-described process by using a model. FIG. 7 is a schematic diagram of a search process that is performed by the search unit 44. For example, as illustrated in FIG. 7, the search unit 44 inputs each of the combined materials and a prompt that includes the instruction prompt to the model.

FIG. 7 illustrates an example of a sentence in a natural language, such as "Please re-examine most suitable one from among candidates in view of a user prompt (corresponding to the advertisement sentence)", as the instruction prompt. With use of the instruction prompt as described above, it is possible to select, by the model, a combined material that most fits for the advertisement purpose sentence from among the combined materials.

Referring back to explanation of FIG. 3, the advertisement generation unit 45 will be described. The advertisement generation unit 45 generates a new advertisement using an advertisement material based on a search result that is obtained by the search unit 44. For example, the advertisement generation unit 45 generates a new advertisement by applying the advertisement material that is included in the search result obtained by the search unit 44 to a template.

For example, the advertisement generation unit 45 makes an inquiry to the model about a template that fits for the advertisement purpose sentence, and selects a template that is to be used for the advertisement. Subsequently, the advertisement generation unit 45 generates a new advertisement by applying the advertisement material that is included in the search result obtained by the search unit 44 to an image insertion position and applying the text of the advertisement to a text insertion position in the template. Meanwhile, the text of the advertisement is text that is displayed as a banner advertisement. For example, the text of the advertisement is generated by using a model based on the advertisement purpose sentence.

Meanwhile, the advertisement generation unit 45 may generate a plurality of advertisements by using a single template, or may generate a plurality of advertisement by using a plurality of templates.

The providing unit 46 provides the advertisement that is generated by the advertisement generation unit 45. For example, the providing unit 46 provides the generated advertisement to the creator terminal 100 of the creator U who is a client. Meanwhile, the providing unit 46 may provide only the advertisement material that is included in the search result obtained by the search unit 44 to the creator terminal 100.

3. Flow of Processes

Figure 8:
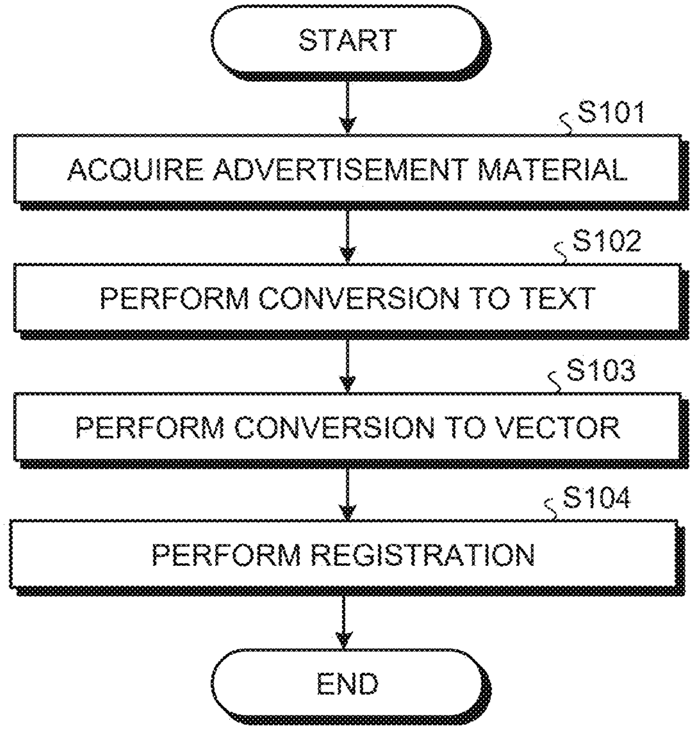
FIG. 8 is a flowchart illustrating an example of the flow of a storage process according to one embodiment.
Figure 9:
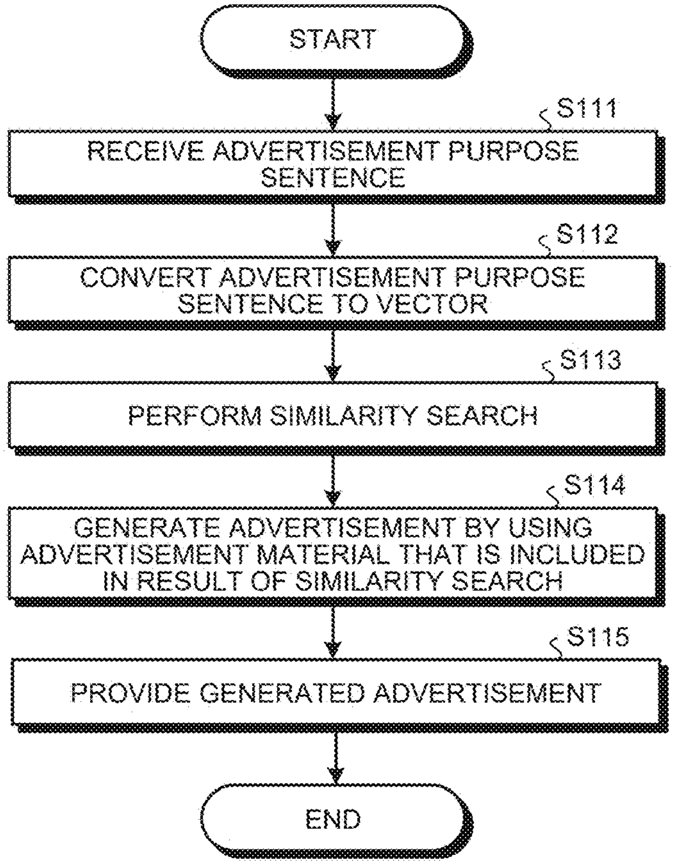
FIG. 9 is a flowchart illustrating an example of the flow of a providing process according to one embodiment.

A flow of processes performed by the information processing apparatus 1 according to one embodiment will be described below with reference to FIG. 8 and FIG. 9. FIG. 8 is a flowchart illustrating an example of the flow of a storage process according to one embodiment. FIG. 9 is a flowchart illustrating an example of the flow of a providing process according to one embodiment. Meanwhile, the processes described below are repeated by the information processing apparatus 1 at predetermined periods.

As illustrated in FIG. 8, when the information processing apparatus 1 acquires a new advertisement material (Step S101), the information processing apparatus 1 converts the advertisement material to text by using a model (Step S102). Specifically, the information processing apparatus 1 generates tag information on the advertisement material by converting the advertisement material to the text.

Subsequently, the information processing apparatus 1 converts the text (tag information) of the advertisement material to a vector (Step S103), registers the converted vector in the advertisement material storage unit 31 (Step S104), and terminates the process.

A flow of an advertisement generation process will be described below with reference to FIG. 9. As illustrated in FIG. 9, first, the information processing apparatus 1 receives the advertisement purpose sentence from the creator U via the creator terminal 100 (Step S111).

Subsequently, the information processing apparatus 1 converts the advertisement purpose sentence to a vector (Step S112). Then, the information processing apparatus 1 performs a similarity search between the vector of the advertisement purpose sentence and the vector of the advertisement material that is stored in the advertisement material storage unit 31 (Step S113).

Thereafter, the information processing apparatus 1 generates an advertisement by using an advertisement material that is included in a result of the similarity search that is performed at Step S113 (Step S114), provides the generated advertisement to the creator terminal 100 (Step S115), and terminates the process.

4. Modification

In one embodiment as described above, the example has been described in which an advertisement is generated with respect to an advertisement purpose sentence that is input by the creator U, that is, an advertisement is generated with respect to a user prompt, but embodiments are not limited to this example.

Figure 10:
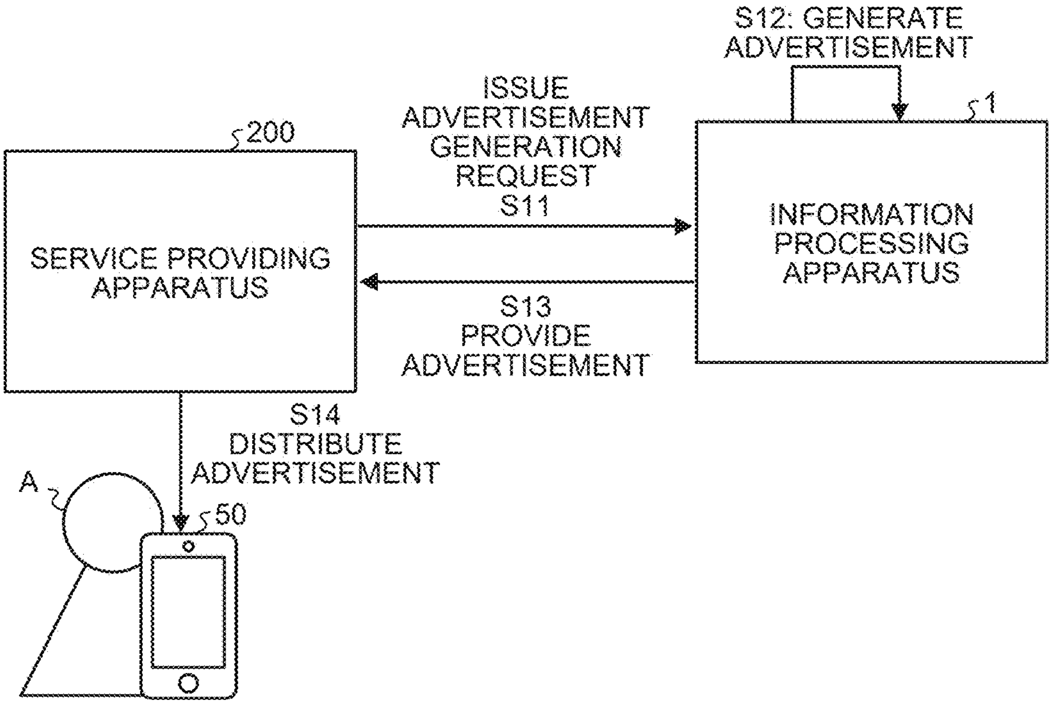
FIG. 10 is a diagram illustrating an example of the information processing according to modification.

Specifically, it may be possible to automatically generate and provide an advertisement. FIG. 10 is a diagram illustrating an example of information processing according to one modification. FIG. 10 illustrates a case in which a service providing apparatus 200 issues an advertisement generation request to the information processing apparatus 1.

The service providing apparatus 200 is an apparatus that provides various kinds of Web services to a user terminal 50 of each of users A. The service providing apparatus 200 is able to distribute an advertisement to the user terminal 50 via a Web service.

For example, in this case, the service providing apparatus 200 issues an advertisement generation request that includes user information on the user A, to whom the advertisement is to be provided, to the information processing apparatus 1 (Step S11). The user information includes, for example, information on a demographic attribute or a psychographic attribute of the user A, or information on an action history of the user A in the Web service.

Furthermore, the action history of the user A in the Web service includes, for example, information on a browsing history, a purchase history, or the like in the Web service. Meanwhile, the service providing apparatus 200 may issue the advertisement generation request that includes information on a distribution page in which the advertisement is distributed, in addition to the user information, for example. The information on the distribution page includes information on a content in which the advertisement is placed.

The information processing apparatus 1 converts the advertisement purpose sentence to a vector, performs a similarity search between the vector of the advertisement purpose sentence and the vector of the advertisement material, and generates an advertisement based on the information as described above (Step S12). Meanwhile, in this case, the information processing apparatus 1 may select an advertisement target in accordance with a rule that is set in advance.

Further, the information processing apparatus 1 provides the generated advertisement to the service providing apparatus 200 (Step S13). Furthermore, the service providing apparatus 200 places the advertisement that is provided from the information processing apparatus 1 in an advertisement space of the distribution page, and distributes the advertisement to the user terminal 50 (Step S14).

In this manner, the information processing according to one modification makes it possible to generate an advertisement in real time based on a request that is issued by the user terminal 50.

5. Effects

The information processing apparatus 1 according to one embodiment includes the tag generation unit 42 that generates tag information on a tag type that is set in advance with respect to an advertisement material, and the search unit 44 that searches for the advertisement material that is used for a new advertisement by using the tag information that is generated by the tag generation unit 42.

Furthermore, the tag generation unit 42 according to one embodiment generates the tag information by using a model that converts an image of the advertisement material to text. Moreover, the tag generation unit 42 according to one embodiment generates the tag information after performing role setting in the model.

Furthermore, the tag generation unit 42 according to one embodiment generates the tag information while designating the tag type in the model. Moreover, the tag generation unit 42 according to one embodiment generates the tag information with respect to the advertisement material of an advertisement that has been used in the past.

By any one of the processes as described above or any combination of the processes as described above, the information processing apparatus according to the present application is able to easily search for an advertisement material.

6. Hardware Configuration

Figure 11:
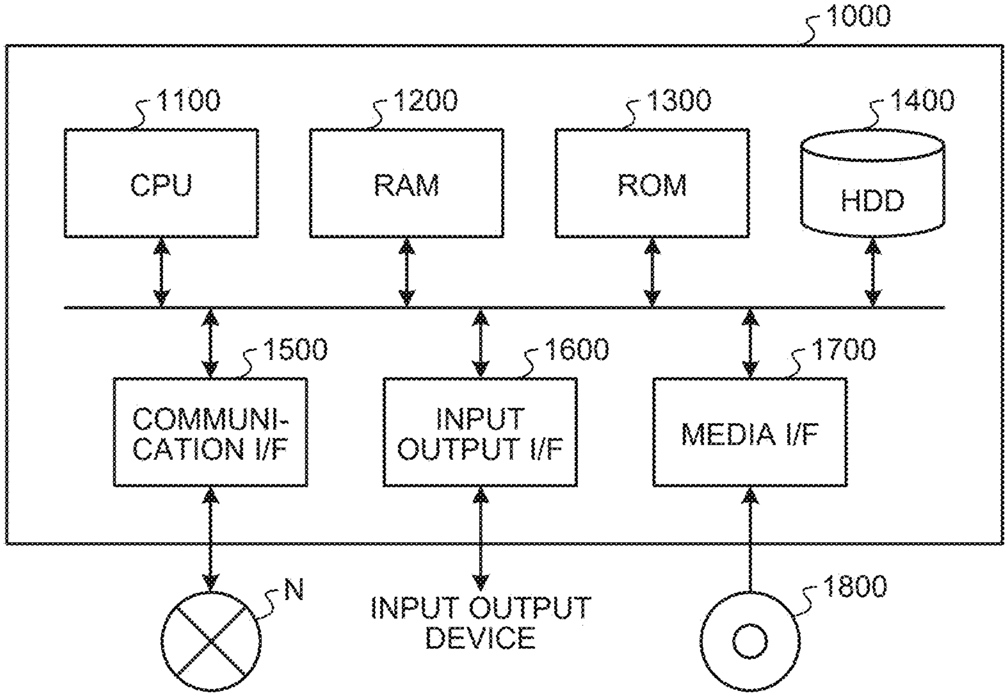
FIG. 11 is a diagram illustrating an example of a hardware configuration of a computer that implements functions of an information processing apparatus according to one embodiment.

The information processing apparatus 1 according to one embodiment as described above is implemented by, for example, a computer 1000 that is configured as illustrated in FIG. 11. FIG. 11 is a diagram illustrating an example of a hardware configuration of a computer that implements the functions of the information processing apparatus according to one embodiment. The computer 1000 includes a CPU 1100, a RAM 1200, a ROM 1300, an HDD 1400, a communication interface (I/F) 1500, an input output interface (I/F) 1600, and a media interface (I/F) 1700.

The CPU 1100 operates based on a program that is stored in the ROM 1300 or the HDD 1400, and controls each of the units. The ROM 1300 stores therein a boot program that is executed by the CPU 1100 at the time of activation of the computer 1000, a program that is dependent on hardware of the computer 1000, and the like.

The HDD 1400 stores therein a program that is executed by the CPU 1100, data that is used by the program, and the like. The communication interface 1500 receives data from a different apparatus via a network (communication network) N, sends the data to the CPU 1100, and transmits data that is generated by the CPU 1100 to a different apparatus via the network N.

The CPU 1100 controls an output device, such as a display or a printer, and an input device, such as a keyboard or a mouse, (in FIG. 8, the output device and the input device are collectively described as an "input output device") via the input output interface 1600. The CPU 1100 acquires data from the input device via the input output interface 1600. Further, the CPU 1100 outputs generated data to the output device via the input output interface 1600.

The media interface 1700 reads a program or data that is stored in a recording medium 1800, and provides the program or the data to the CPU 1100 via the RAM 1200. The CPU 1100 loads the program from the recording medium 1800 onto the RAM 1200 via the media interface 1700, and executes the loaded program. The recording medium 1800 is, for example, an optical recording medium, such as a Digital Versatile Disc (DVD) or a Phase change rewritable Disk (PD), a magneto-optical recording medium, such as a Magneto-Optical disk (MO), a tape medium, a magnetic recording medium, a semiconductor memory, or the like.

For example, when the computer 1000 functions as the information processing apparatus according to one embodiment, the CPU 1100 of the computer 1000 executes a program that is loaded on the RAM 1200 and implements the functions of the control unit 4. The CPU 1100 of the computer 1000 reads the programs from the recording medium 1800 and executes the programs; however, as another example, it may be possible to acquire the programs from a different apparatus via the network N.

7. Others

While one embodiment of the present application has been described above, the present invention is not limited by the details of the above-described embodiment. Further, the components described above include one that can be easily thought of by a person skilled in the art, one that is practically identical, and one that is within an equivalent range. Furthermore, the components described above may be combined appropriately. Moreover, within the scope not departing from the gist of the above-described embodiment, various omission, replacement, and modifications of the components may be made.

Of the processes described in the embodiment above, all or part of a process described as being performed automatically may also be performed manually. Alternatively, all or part of a process described as being performed manually may also be performed automatically by known method. In addition, the processing procedures, specific names, and information including various kinds of data and parameters illustrated in the above-described document and drawings may be arbitrarily changed unless otherwise specified. For example, various kinds of information illustrated in each of the drawings are not limited to the information illustrated in the drawings.

Furthermore, the components of the apparatuses illustrated in the drawings are functionally conceptual and do not necessarily have to be physically configured in the manner illustrated in the drawings. In other words, specific forms of distribution and integration of the apparatuses are not limited to those illustrated in the drawings, and all or part of the apparatuses may be functionally or physically distributed or integrated in arbitrary units depending on various loads or use conditions.

For example, the configuration may be flexibly changed such that the information processing apparatus as described above may be implemented by a plurality of server computers or may be implemented by calling an external platform by an Application Programming Interface (API) or a network computing depending on functions.

In addition, the "unit (section, module, unit)" described above may be replaced with a "means", a "circuit", or the like. For example, the acquisition unit may be replaced with an acquisition means or an acquisition circuit.

According to one aspect of the present invention, it is possible to easily search for an advertisement material.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
- tag generation circuitry configured to generate tag information on a tag type that is set in advance with respect to an advertisement material by using a model that converts an image of the advertisement material to text,
- wherein the tag generation circuitry generates the tag information after performing role setting in the model by inputting, to the model, the advertisement material and a prompt that includes:
  - a first text that is a sentence for performing the role setting,
  - a second text that is a sentence for giving a specific instruction to generate the tag information,
  - a third text that is a sentence for instructing the tag type, and
  - a fourth text that is a sentence for defining a meaning of each of tags that are specified by the tag type; and
- search circuitry configured to search for the advertisement material that is used for a new advertisement by using the tag information that is generated by the tag generation circuitry.

2. The information processing apparatus according to claim 1, wherein the tag generation circuitry generates the tag information while designating the tag type in the model.

3. The information processing apparatus according to claim 1, wherein the tag generation circuitry generates the tag information with respect to the advertisement material of an advertisement that has been used in a past.

4. The information processing apparatus according to claim 1, wherein the role setting includes setting a role of a creative designer in the model.

5. The information processing apparatus according to claim 1, further comprising:
- vector conversion circuitry configured to convert the tag information that is generated by the tag generation circuitry to a tag vector,
- wherein the search circuitry is configured to:
- receive an advertisement purpose sentence,
- convert the advertisement purpose sentence to a sentence vector, and
- search for the advertisement material by performing a similarity search between the tag vector and the sentence vector.

6. The information processing apparatus according to claim 5, wherein the search circuitry is configured to search for the advertisement material by retrieving a tag vector for which a cosine similarity with the sentence vector exceeds a threshold.

7. The information processing apparatus according to claim 5, wherein the search circuitry is configured to:
- generate combined materials in each of which a plurality of advertisement materials are combined,
- calculate a degree of match with the advertisement purpose sentence for each of the combined materials, and
- output, as a search result, a combined material for which the degree of match is high.

8. The information processing apparatus according to claim 1, further comprising:
- advertisement generation circuitry configured to generate a new advertisement by applying the advertisement material that is searched by the search circuitry to a template that includes an image insertion position and a text insertion position.

9. The information processing apparatus according to claim 8, wherein the advertisement generation circuitry is configured to make an inquiry to the model about a template that fits for an advertisement purpose sentence, and select the template that is to be used for the new advertisement.

10. An information processing method that is implemented by a computer, the information processing method comprising:
- generating tag information on a tag type that is set in advance with respect to an advertisement material by using a model that converts an image of the advertisement material to text,
- wherein the generating includes performing role setting in the model by inputting, to the model, the advertisement material and a prompt that includes:
  - a first text that is a sentence for performing the role setting,
  - a second text that is a sentence for giving a specific instruction to generate the tag information,
  - a third text that is a sentence for instructing the tag type, and
  - a fourth text that is a sentence for defining a meaning of each of tags that are specified by the tag type; and
- searching for the advertisement material that is used for a new advertisement by using the tag information that is generated at the generating.

11. A non-transitory computer readable storage medium having stored therein an information processing program that causes a computer to execute a process, the process comprising:
- generating tag information on a tag type that is set in advance with respect to an advertisement material by using a model that converts an image of the advertisement material to text,
- wherein the generating includes performing role setting in the model by inputting, to the model, the advertisement material and a prompt that includes:
  - a first text that is a sentence for performing the role setting,
  - a second text that is a sentence for giving a specific instruction to generate the tag information,
  - a third text that is a sentence for instructing the tag type, and
  - a fourth text that is a sentence for defining a meaning of each of tags that are specified by the tag type; and
- searching for the advertisement material that is used for a new advertisement by using the tag information that is generated at the generating.

* * * * *